United States Patent [19]

Frania

[11] Patent Number: 5,222,579
[45] Date of Patent: Jun. 29, 1993

[54] DEVICE FOR AUTOMATIC SLACK ADJUSTMENT OF A BRAKE, IN PARTICULAR A VEHICLE BRAKE

[75] Inventor: Josef Frania, Hanover, Fed. Rep. of Germany

[73] Assignee: WABCO Westinghouse Fahrzeugbremsen GmbH, Hanover, Fed. Rep. of Germany

[21] Appl. No.: 713,997

[22] Filed: May 30, 1991

[30] Foreign Application Priority Data

Jun. 5, 1990 [DE] Fed. Rep. of Germany ....... 4017949

[51] Int. Cl.⁵ ...................... F16D 51/00; F16D 65/52
[52] U.S. Cl. ........................ 188/79.55; 188/196 BA
[58] Field of Search ............ 188/79.51, 79.54, 79.55, 188/79.57, 196 R, 196 BA, 196 M, 196 V, 196 C, 196 D, 196 B; 192/111 A

[56] References Cited

U.S. PATENT DOCUMENTS

| | | | |
|---|---|---|---|
| 3,351,164 | 11/1967 | Svensson | 188/79.55 X |
| 3,692,152 | 9/1972 | Larsson | 188/79.55 |
| 4,019,612 | 4/1977 | Matthews et al. | 188/79.55 |
| 4,440,268 | 4/1984 | Karlsson | 188/79.55 |
| 4,596,319 | 6/1986 | Cumming | 188/79.55 |
| 4,620,618 | 11/1986 | Monick | 188/79.55 X |

FOREIGN PATENT DOCUMENTS

| | | |
|---|---|---|
| 1480038 | 11/1970 | Fed. Rep. of Germany . |
| 2104921 | 8/1971 | Fed. Rep. of Germany . |
| 2528603 | 1/1976 | Fed. Rep. of Germany . |
| 3625107 | 9/1987 | Fed. Rep. of Germany . |
| 8201922 | 6/1982 | World Int. Prop. O. . |

*Primary Examiner*—Robert J. Oberleitner
*Assistant Examiner*—Peter M. Poon
*Attorney, Agent, or Firm*—Horst M. Kasper

[57] ABSTRACT

An apparatus is furnished for the automatic adjustment of a brake in particular of a vehicle brake. The invention device provides generous assembly tolerances while employing relatively simple device components. The drive of the slack adjustment device (2, 4), formed from the gear rack drive (8, 9, 12), is surrounded in longitudinal direction of the gear rack by free spaces (30, 31), which furnish an appropriate clearance space to the gear rack (9). A pinion engages a second set of gear teeth of the gear rack. The pinion and a lost motion device drive the slack adjustment device. The drive device formed by the gear wheel, by the gear rack and by the pinion is disposed between the brake lever and a slack adjustment device. The device is suitable, in particular, to be employed in a brake lever with an automatic slack adjustment device.

18 Claims, 3 Drawing Sheets

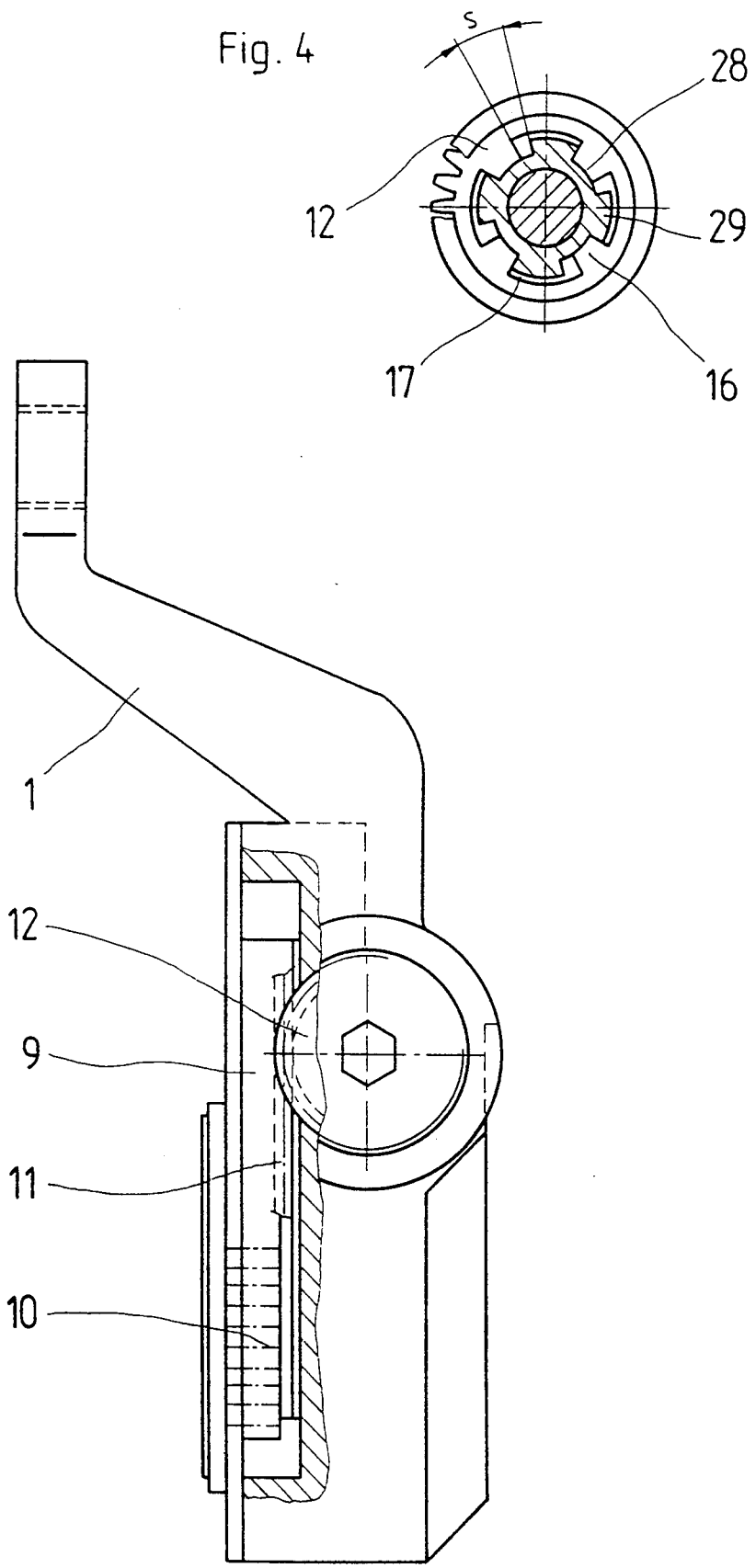

DEVICE FOR AUTOMATIC SLACK ADJUSTMENT OF A BRAKE, IN PARTICULAR A VEHICLE BRAKE

BACKGROUND OF THE INVENTION

1. Field of the Invention

The invention relates to a device for the automatic slack adjustment of a brake including a brake lever, disposed on a brake operating shaft, and furnished with a brake slack adjustment device between the brake lever and the brake operating shaft, where the slack adjustment device adjusts the brake operating shaft relative to the brake lever around the rotation axis of the brake operating shaft.

2. Brief Description of the Background of the Invention Including Prior Art

Such a device has been known from the PCT application publication WO No. 82/01922. The conventional device includes a slack adjustment device, which slack adjustment device allows to adjust the parts of the brake actuator relative to each other, namely a brake operating shaft and a brake lever disposed on the brake operating shaft. The adjustment serves for a continuous readjustment of the brake actuator, which is subject to a deviation from a preset starting position based on brake lining wear. The slack adjustment device can be actuated with a drive device when the brake lever is moved into brake operating direction. The drive device is disposed between a reference point, fixed relative to the brake lever, and the slack adjustment device. A gear coupling with an increased gear play serves as a lost motion device between the drive device and the slack adjustment device. The lost motion device allows a brake lever deflection without an actuation of the slack adjustment device. Transfer means of the drive device comprise a spur wheel pair and a worm drive connected to the spur wheel pair. These transfer means allow a generous assembly tolerance of the brake lever relative to the fixed reference point. Disadvantageous in this case is the relatively large construction expenditure for the transmission means as well as the requirement for an increased production expenditure for the bearing supports, disposed on rotary axes running staggered relative to each other.

A similar automatic brake adjustment device is known from the German Patent Application Laid Out DE-AS No. 1,480,038 where a gear rack drive is employed instead of the previously recited worm drive. The slack adjustment of the wear-caused release gap and brake slack play is performed by the motion of the brake lever in the brake release direction and not in the brake actuation direction as in the previously recited device. The drive force at the adjustment mechanism for the adjustment of the brake slack play during the brake cylinder release stroke in brake release direction can be obtained in this case only from the existing pull-back springs of the brake operating elements. In case of a relatively hard-operating brake actuator, frequently additional auxiliary pull-back springs have therefore to be disposed on the outside at the brake actuator in order that a still sufficient drive force remains available for the slack adjustment motion and for the release of the brake. The gear rack drive requires a stop fixedly disposed at the casing. The starting position of the gear rack drive is defined by the position of the stop. The device therefore requires in a disadvantageous manner a precise adjustment of the brake lever relative to the fixed reference point. The exceeding of a deviation tolerance can result in a breakage of the device after the gear rack drive reaches the stop fixedly disposed at the casing.

The German Patent DE-PS No. 3,625,107 teaches an automatic slack adjustment device for the expanding cam of a drum brake. The reference teaches to employ a worm 4 and a worm gear to provide an automatic slack adjustment device for vehicle brakes. A coupling part is supported with limited shiftability against the force of a compression spring on a worm shaft such that the gear 6 and 8 become disengaged (column 4, lines 29 through 32). The reference teaches a second coupling which is formed as a free wheel and which allows motions in an opposite rotary sense relative to a first coupling. The presence of two coupling parts makes this adjustment device relatively complicated.

The German Printed Patent document DE-OS No. 2,104,921 teaches a slack adjustment device for brakes. The reference teaches that a worm is rotatable upon release of a bolting relative to a lever and that a worm wheel can be rotated around an axis and thus the brake slack of the brake device can be adjusted. If an excessive brake slack is determined, then the brake slack can be automatically adjusted by rotation of the worm. It appears that the reference device allows only a slack adjustment and determination with a limited precision and reliability.

The German Printed Patent document DE-OS No. 2,528,603 teaches a device for the adjustment of the slack of a brake The reference teaches an automatic adjustment means, which is connected with an adjustment shaft 34 such that, upon rotation of a control lever 30 around a predetermined angle in the direction of brake actuation, the automatic adjustment means rotate the adjustment shaft in the direction of readjustment of the brake. The reference teaches that the grooves are wider than the width of the springs so that the drive shell 52 can be rotated relative to the adjustment shaft 34 by a preset value until the edges of the springs contact the corresponding edges of the grooves. The reference teaches a connection between the drive shell 52 and the adjustment shaft 34.

Thus, the art show various features which have been employed in connection with the construction of slack adjusters for brake systems.

SUMMARY OF THE INVENTION

1. Purposes of the Invention

It is an object of the present invention to improve a brake slack adjustment device such that, compared to conventional structures, there is achieved a generous assembly tolerance for the brake lever relative to a fixed vehicle reference point, while simple device components are employed and small production expenditures are required.

It is another object of the present invention to provide a brake slack adjustment device involving simple handling.

It is a further object of the present invention to provide a reliable brake slack adjustment device.

These and other objects and advantages of the present invention will become evident from the description which follows.

2. Brief Description of the Invention

According to the present invention, there is provided a device for an automatic slack adjustment of a brake comprising a brake lever including a casing. A slack adjustment device is attached to the brake lever for connecting the brake lever to a brake operating shaft. The slack adjustment device is constructed to allow an adjustment of the brake-operating shaft by turning the brake-operating shaft around its axis relative to the brake lever position. A gear rack has a first set of gear teeth and a second set of gear teeth. A gear wheel is solidly attached to a vehicle chassis and thereby excludes rotation of the gear wheel relative to the vehicle chassis. The gear wheel engages with the first set of gear teeth of the gear rack of a gear rack drive. A drive device for actuating the slack adjustment device is formed by a gear rack and the gear wheel. A pinion engages the second set of gear teeth of the gear rack. The slack adjustment device is driven by the pinion. The drive device is disposed between a reference point, fixed relative to the brake lever, and the slack adjustment device. A lost motion device is engaged by the pinion and serves for a lifting of the fixed connection, excluding relative rotation, between the drive device and the slack adjustment device during an overcoming of a preset brake slack and release gap. A one-way coupling is connected between the lost motion device and the slack adjustment device is formed such that the fixed connection, excluding relative rotation, between the lost motion device and the slack adjustment device, is generated by a motion of the brake lever into a brake-actuating direction. The drive device to the slack adjustment device is connected by the one-way coupling. The one-way coupling forms a fixed connection, excluding relative rotation, between the drive device and the slack adjustment device in case where the slack adjustment device is moved in a direction effecting an actuation of the brakes for decreasing the brake slack and release gap between the brake shoes and the brake drum. A casing of the brake lever surrounds the gear rack drive and is furnished with free spaces disposed in longitudinal direction of the gear rack and surrounding the gear rack. The free spaces are formed such that the possible turning of the brake lever, relative to the vehicle chassis and thus the stroke of the gear rack, can be larger than the stroke which is determined by the size of brake slack and release gap.

The brake can be a vehicle brake. The lost motion device can be formed by a gear coupling disposed between the pinion and a coupling part of the one-way coupling. The gear coupling can exhibit a lost motion generated by gear back lash S, which lost motion path can correspond to the predetermined size of brake slack and release gap.

The gear coupling can include at least one tooth of the pinion and at least one tooth gap of the coupling part of the one-way coupling.

The tooth can be disposed at an inner periphery of the pinion. The tooth gap can be disposed at an outer circumference of the coupling part.

The gear coupling can include at least one tooth gap of the pinion and at least one tooth of the coupling part of the one-way coupling.

The tooth gap can be disposed at an inner periphery of the pinion. The tooth can be disposed at an outer circumference of the coupling part.

The present invention is associated with the advantage that the slack adjustment device can be automatically adjusted and readjusted to a starting position of the brake lever, determined by the installation situation in the vehicle, by repeated braking processes over a relatively large angle region and consequently a precise adjustment of the device during the first initial mounting is therefore not required.

The invention structure is further associated with the advantage of being easily operated and of easy handling, for example, during the re-adjustment after a brake lining change, where a destruction of the brake device components is avoided based on a possibly erroneous adjustment and setting.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention:

FIG. 3 is a part view of a drive of the brake actuator according to FIG. 1;

FIG. 4 is a view of a lost motion device of the embodiment according to FIG. 1.

DESCRIPTION OF INVENTION AND PREFERRED EMBODIMENT

Figure 1:
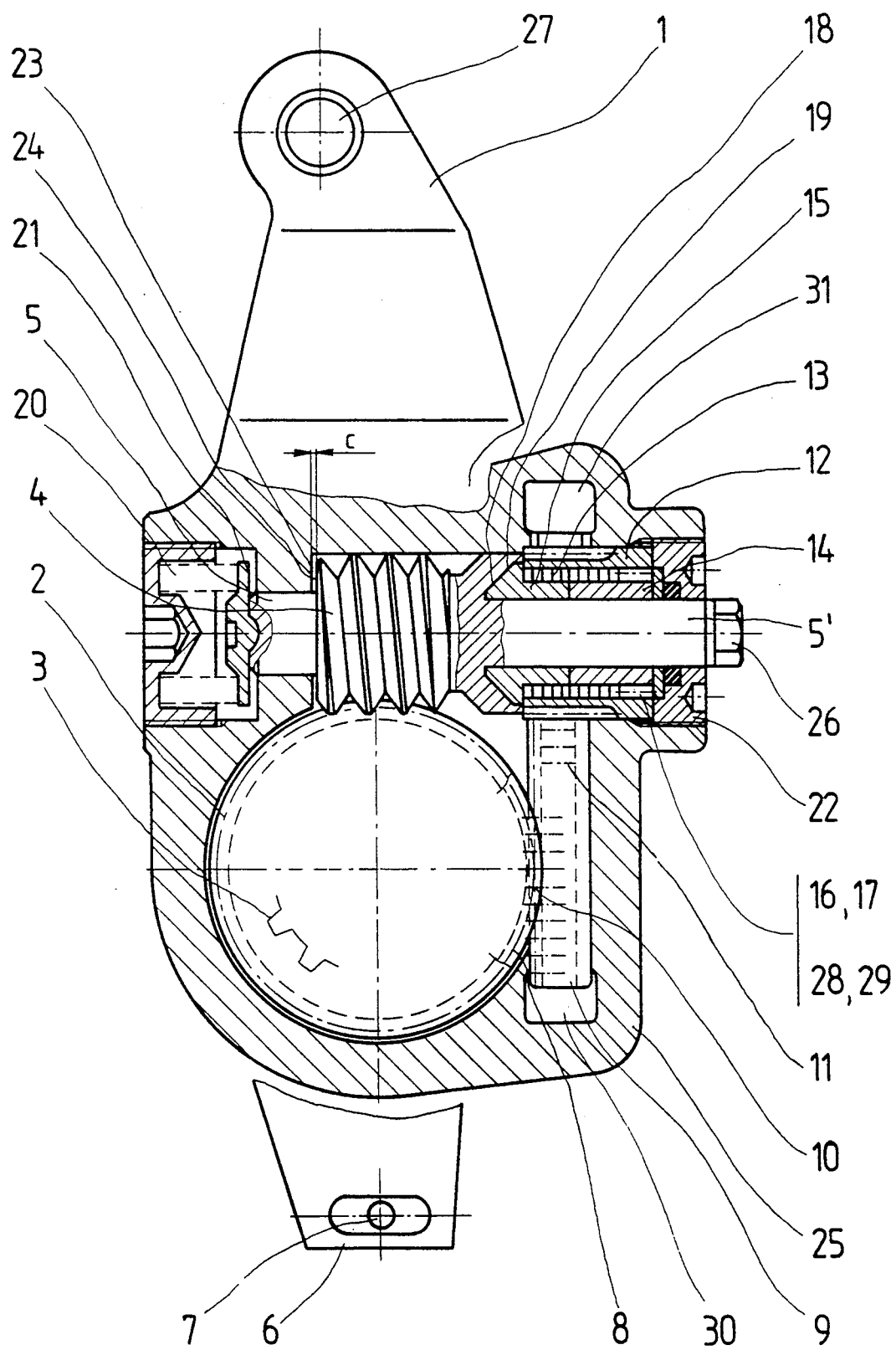
FIG. 1 is an in part sectional view of a brake actuator.

According to the present invention, there is provided a device for an automatic slack adjustment of a brake, in particular a vehicle brake. A brake lever is disposed on a brake-operating shaft and furnished with a slack adjustment device between the brake lever and the brake-operating shaft. The brake-operating shaft is adjustable by turning the brake-operating shaft around its rotation axis relative to the brake lever position with the slack adjustment device. A drive device actuates the slack adjustment device. The drive device is disposed between a reference point, fixed relative to the brake lever, and the slack adjustment device. The drive device is connectable to the slack adjustment device via a one-way coupling. The one-way coupling only forms a fixed connection, excluding relative rotation, between the drive device and the slack adjustment device in case where the slack adjustment device is moved in a direction effecting an actuation of the brakes for decreasing the brake slack and release gap between the brake shoes and the brake drum. The one-way coupling is formed such that the fixed connection, excluding relative rotation, between the drive device and the slack adjustment device is generated by a motion of the brake lever into a brake-actuating direction. A lost motion device 16, 17; 28, 29 is serving for a lifting of the fixed connection excluding relative rotation between the drive device and the slack adjustment device during an overcoming of a preset brake slack and release gap. The drive device 8, 9, 12 is formed as a gear rack drive and exhibits a gear wheel 8, fixedly connected under exclusion of relative rotation to the fixed reference point 7. The gear wheel 8 engages with a first set of gear teeth 10 of the gear rack 9 of the gear rack drive. The gear rack 9 exhibits a second set of gear teeth 11, which engages with a pinion 12 driving the slack adjustment device. The casing 25 of the brake lever 1, surrounding the gear rack drive, is furnished with free spaces 30, 31 in longitudinal direction of the gear rack 9. The free spaces 30, 31 are formed such that the possible turning of the brake lever 1, relative to the fixed reference point 7 and thus the stroke of the gear rack, can be larger than the stroke which is determined by the brake slack and release gap.

The lost motion device 16, 17; 28, 29 can be formed by a gear coupling 16, 17; 28, 29 disposed between the pinion 12 and a coupling part 14 of a one-way coupling 13, 14, 15. The gear coupling 16, 17; 28, 29 can exhibit a lost motion generated by gear back lash S. This lost motion path corresponds to a predetermined brake slack and release gap.

The gear coupling 16, 17; 28, 29 can include at least one tooth 16 or one tooth gap 17 of the pinion 12 and at least one tooth gap 28 or one tooth 29 of the coupling part 14 of the one-way coupling 13, 14, 15. The teeth 16, 29 or tooth gaps 17, 28 in each case can be disposed at the inner periphery of the pinion 12 or, at the outer circumference of the coupling part 14, respectively.

The invention device is provided for a compensation of the brake lining wear by automatic slack adjustment of the brake actuator. The same reference numerals are employed for equivalent device elements in FIGS. 1, 2, 3, and 4.

FIG. 1 illustrates a brake lever 1, which is connected via a worm wheel 2 with a wedge profile 3 to a brake operating shaft, not illustrated in the drawing.

The brake operating shaft is pivotable in a conventional way around a limited deflection angle around the longitudinal axis of the brake operating shaft, whereby brake shoes, preferably actuatable by S cams, are brought to rest at the brake drum. The worm wheel 2, fixedly connected against rotation with the brake operating shaft, engages a worm 4. The worm shaft 5 and the shaft extension 5' of the worm 4 are rotatably supported in the brake lever 1 and are disposed perpendicular to the brake operating shaft. The worm wheel 2 and the worm 4 form the slack adjustment device 2, 4 of the brake actuator.

An adjustment lever 6 is connected to a reference point 7 of the vehicle, which reference point 7 is fixed relative to the brake lever 1. The adjustment lever 6 is further connected, fixed against rotation, with a gear wheel 8, disposed concentrically to the longitudinal axis of the brake operating shaft or the rotation axis of the brake lever 1, respectively.

Figure 2:
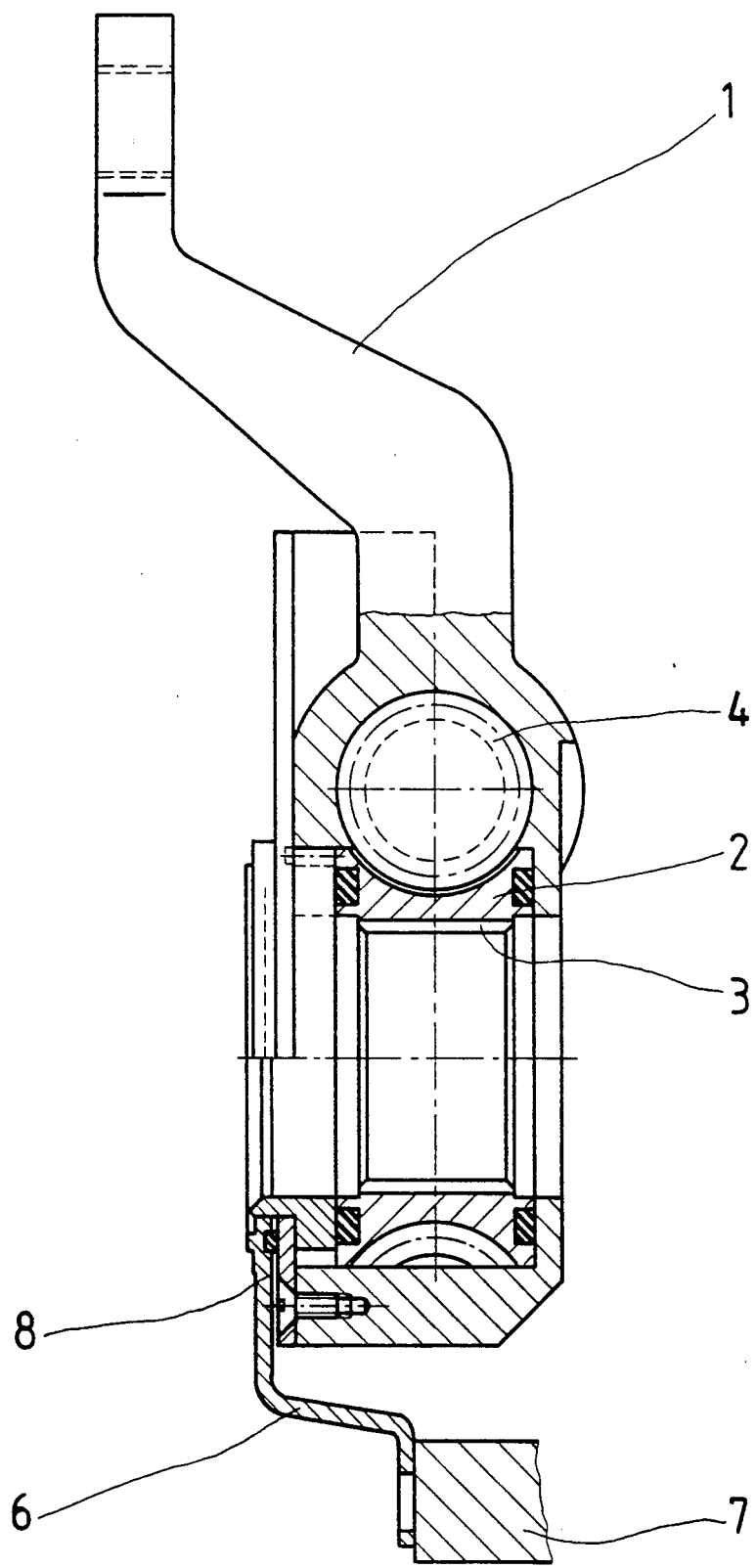
FIG. 2 is an in part sectional side view of the brake actuator according to FIG. 1.

The brake lever 1 can be pivoted around the gear wheel 8. A gear rack 9 engages with a first set of gear teeth 10 into the gear wheel 8 and engages with a second set of gear teeth 11 into a pinion 12, rotatably supported on the worm shaft 5, as illustrated in FIGS. 1 and 3. The connection of the adjustment lever 6 to the gear wheel 8 is fixed excluding rotation, as illustrated in FIG. 2.

The gear wheel 8, the gear rack 9, and the pinion 12 form a drive device 8, 9, 12 representing a gear rack drive. The drive device 8, 9, 12 features an actuating and propelling connection to the slack adjustment device 2, 4 through a one-way coupling 13, 14, 15 operating as a free-wheel clutch. The one-way coupling 13, 14, 15 exhibits shell-shaped coupling parts 14 and 15, which are rotatably supported on the worm shaft 5.

The casing 25 of the brake lever 1 surrounds the drive device 8, 9, 12 and is furnished with free spaces 30, 31 in the longitudinal direction of the gear rack 9. The free spaces 30, 31 are formed such that a possible turn of the brake lever 1, relative to the fixed reference point 7, can be larger than a turn corresponding to and predefined by the brake slack play or, respectively, the brake release gap.

The connection of the drive device 8, 9, 12 to the slack adjustment device 2, 4 is performed via a lost motion device or lost motion device, as illustrated in FIG. 4. The lost motion device is formed in the kind of a gear coupling 16, 17; 28, 29. The pinion 12, coordinated to and engaged by the drive device 8, 9, 12 exhibits at least one tooth 16 or a tooth gap 17, which is engaged with at least one tooth gap 28 or one tooth 29 of the coupling part 14, coordinated to the one-way coupling 13, 14, 15. The teeth 16, 29 and the tooth gaps 17, 28 can be disposed at the inner periphery of the pinion 12 or at the outer periphery of the coupling part 14, respectively.

The gear coupling 16, 17; 28, 29 is furnished with a back lash S generating the lost motion. The pinion 12 and the coupling part 14 are rotatable relative to each other around their rotation axes corresponding to the amount of the back lash S.

This back lash S corresponds to a turning angle of the brake lever 1 and of the brake operating shaft, where the brake shoes pass through a release gap actuating slack of the brake while the brake shoes are brought from the non-engaging rest and starting position to the contact position at the brake drum.

The connection of the two coupling parts 14 and 15 is performed by way of a coil spring 13. The coil spring 13 is pressed onto the cylindrical sections of the two coupling parts 14 and 15 with a radial pretension and in each case with about half the number of windings.

The worm 4 is furnished with a conical recess 18 on its side disposed toward the drive device 8, 9, 12. A conical protrusion 19 of the coupling part 15 engages into the conical recess 18. The worm 4 and the coupling parts 14 and 15 are tensioned in their longitudinal direction against a casing cover 22, formed as a support bearing, by way of a compression spring 20 via a spring plate 21. A frictional connection is thereby formed between the worm 4 and the coupling part 15 at the conically shaped structures, formed by the conical recess 18 and the conical protrusion 19.

A clearance gap play C is present at the side of the worm 4 disposed remote relative to the drive device 8, 9, 12 between a stop 23 on the casing side and a thrust face 24 of the worm 4, where the worm 4 is movable by the clearance gap play C in a direction toward the compression spring 20.

The worm shaft 5 exhibits a shaped profiling form 26 for the engagement of a key at end an of the worm shaft protruding from the casing 25 of the brake lever 1. The slack adjustment device 2, 4 can be manually operated with the key. The braking lever 1 exhibits a bearing position 27 for the connection to an actuating element or a final control element, for example, a brake cylinder.

The mode of operation of the device is as follows:

Upon a light brake application the brake lever 1 performs a corresponding pivoting motion with the brake operating shaft, whereby the brake shoes are brought to rest at the brake drum. The brake lever 1 thereby moves relative to the adjustment lever 6 connected to the reference point 7 and relative to the gear wheel 8, fixed against rotation to the adjustment lever 6. The swivelling motion of the brake lever 1 thus leads to a relative motion of the gear rack 9 relative to the gear wheel 8, whereby the swivelling motion of the brake lever 1 is transformed into a corresponding rotary motion of the pinion 12. In case of an ideal brake slack release gap between the brake shoes and the brake drum, the back lash S of the gear coupling 16, 17 is in this case run through.

Upon a further increase of the brake force at the bearing position 27 of the brake lever 1, there is performed a continuing swivelling motion of the brake lever 1, based on the elasticity present in the mechanical part of the brake device, where the further continuing swivelling motion effects also a continuing rotary motion of the pinion 12. An increased brake torque generated thereby, is transferred via the brake operating shaft and the worm wheel 2 onto the worm 4, and generates a force directed axially against the compression spring 20. When the force has a corresponding size, it effects a shifting of the worm 4 by the clearance C against the stop 23. The frictional connection is thereby lifted and interrupted at the conically shaped structures, i.e. the conical recess 18 and the conical protrusion 19 of the worm 4 and the coupling part 15. The coupling parts 14, 15 are rotated without taking along the worm 4 based on the one-way coupling 13, 14, 15 blocked in the brake actuator.

Upon release of the brake, the above described process is performed in a reverse direction. i.e. the frictional and force transmitting connection between the conically shaped structures, i.e. the conical recess 18 and the conical protrusion 19, is restored. The coupling part 14 is rotated under the coil spring 13, because the one-way coupling becomes effective as a free-wheel clutch in the brake release direction.

If the slack play and the lost motion increase at the wheel brake between the brake shoes and the brake drum caused by brake lining wear and brake drum wear, then the brake lever performs a larger swivelling motion upon brake actuation until the brake shoes rest and contact completely at the brake drum. During this actuating phase, all device components of the adjustment drive are connected to each other through the installed couplings. Thus, during each brake actuation, the slack adjustment device 2, 4 continues to rotate automatically also the worm 4 as well as the worm shaft 5 with the brake operating shaft in a direction of clearance decrease for such a time until the clearance between the brake shoes and the brake drum has been decreased to a point of a desired clearance gap.

It will be understood that each of the elements described above, or two or more together, may also find a useful application in other types of slack adjustment devices differing from the types described above.

While the invention has been illustrated and described as embodied in the context of a device for automatic adjustment of a brake, in particular a vehicle brake, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for an automatic slack adjustment of a brake comprising:
    a brake lever;
    a slack adjustment device attached to the brake lever for connecting the brake lever to a brake operating shaft, wherein the slack adjustment device is constructed to allow an adjustment of the brake-operating shaft by turning the brake-operating shaft around its axis relative to the brake lever position;
    a gear rack having a first set of gear teeth and having a second set of gear teeth;
    a gear wheel for solid attachment to a vehicle chassis and thereby excluding rotation of the gear wheel relative to the vehicle chassis, wherein the gear wheel engages with the first set of gear teeth of the gear rack of a gear rack drive, and wherein the gear rack and the gear wheel form a drive device for actuating the slack adjustment device;
    a pinion engaging the second set of gear teeth of the gear rack, wherein the pinion drives the slack adjustment device, and wherein the drive device is disposed between a reference point fixed relative to the brake lever and the slack adjustment device;
    a lost motion device engaged by the pinion and serving for a lifting of a fixed connection, excluding relative rotation, between the drive device and the slack adjustment device during an overcoming of a preset brake slack and a release gap;
    a one-way coupling connected between the lost motion device and the slack adjustment device formed such that the fixed connection, excluding relative rotation, between the lost motion device and the slack adjustment device is generated by a motion of the brake lever into a brake-actuating direction, wherein the one-way coupling connects the drive device to the slack adjustment device, wherein the one-way coupling only forms a fixed connection, excluding relative rotation, between the drive device and the slack adjustment device in case where the slack adjustment device is moved in a direction effecting an actuation of the brakes for decreasing a brake slack and a release gap between the brake shoes and the brake drum,
    wherein upon completion of an actuation there is a free space on top and bottom of the gear rack such that no precise readjustment is necessary upon reworking of a brake line;
    a casing of the brake lever surrounding the gear rack drive and furnished with free spaces disposed in longitudinal direction of the gear rack and surrounding the gear rack, wherein the free spaces are formed such that the possible turning of the brake lever, relative to the vehicle chassis and thus the stroke of the gear rack, can be larger than the stroke which is determined by the size of brake slack and release gap.

2. The device for an automatic slack adjustment according to claim 1, wherein the brake is attached to a vehicle.

3. The device for automatic slack adjustment according to claim 1, wherein the lost motion device is formed by a gear coupling disposed between the pinion and a first coupling part of the one-way coupling.

4. The device for automatic slack adjustment according to claim 1,
wherein the lost motion device exhibits a lost motion path generated by a gear back lash (S), which lost motion path corresponds to the predetermined size of the brake slack and the release gap.

5. The device for automatic slack adjustment according to claim 1,
wherein the one way coupling includes a first coupling part engaging the pinion, wherein a first one of the first coupling part and of the pinion has at least one tooth and wherein a second one of the first coupling part and of the pinion has at least one tooth gap.

6. The device for automatic slack adjustment according to claim 5, wherein the first coupling part and the second coupling part are tensioned in a longitudinal direction against a casing cover with a compression spring through a spring plate.

7. The device for automatic slack adjustment according to claim 1 further comprising a coil spring, wherein the one way coupling includes a first coupling part and a second coupling part and wherein the connection between the first coupling part and a second coupling part is performed by the coil spring.

8. The device for automatic slack adjustment according to claim 7,
wherein the coil spring is pressed onto a cylindrical section of the first coupling part and onto a cylindrical section of the second coupling part with a radial pretension.

9. A device for an automatic slack adjustment of a brake comprising:
a brake lever including a casing;
a slack adjustment device attached to the brake lever for connecting the brake lever to a brake operating shaft, wherein the slack adjustment device is constructed to allow an adjustment of the brake-operating shaft by turning the brake-operating shaft around its axis relative to the brake lever position;
a gear rack having a first set of gear teeth and having a second set of gear teeth;
a gear wheel for solid attachment to a vehicle chassis and thereby excluding rotation of the gear wheel relative to the vehicle chassis, wherein the gear wheel engages with the first set of gear teeth of the gear rack of a gear rack drive, and wherein the gear rack and the gear wheel form a drive device for actuating the slack adjustment device;
a pinion engaging the second set of gear teeth of the gear rack, wherein the pinion drives the slack adjustment device, and wherein the drive device is disposed between a reference point fixed relative to the brake lever and the slack adjustment device;
a lost motion device engaged by the pinion and serving for a lifting of a fixed connection, excluding relative rotation, between the drive device and the slack adjustment device during an overcoming of a preset brake slack and release gap;
a one-way coupling connected between the lost motion device and the slack adjustment device formed such that the fixed connection, excluding relative rotation, between the lost motion device and the slack adjustment device is generated by a motion of the brake lever into a brake-actuating direction, wherein the one-way coupling connects the drive device to the slack adjustment device, wherein the one-way coupling only forms a fixed connection, excluding relative rotation, between the drive device and the slack adjustment device in case where the slack adjustment device is moved in a direction effecting an actuation of the brakes for decreasing the brake slack and release gap between the brake shoes and the brake drum;
a casing of the brake lever surrounding the gear rack drive and furnished with free spaces disposed in longitudinal direction of the gear rack and surrounding the gear rack, wherein the free spaces are formed such that the possible turning of the brake lever, relative to the vehicle chassis and thus the stroke of the gear rack, can be larger than the stroke which is determined by the size of brake slack and release gap,
wherein the lost motion device is formed by a gear coupling disposed between the pinion and a coupling part of the one-way coupling, and wherein the gear coupling exhibits a lost motion generated by gear back lash (S), which lost motion path corresponds to the predetermined size of brake slack and release gap.

10. The device for automatic slack adjustment according to claim 9, wherein the gear coupling includes at least one tooth of the pinion and at least one tooth gap of the coupling part of the one-way coupling.

11. The device for automatic slack adjustment according to claim 10, wherein the tooth is disposed at an inner periphery of the pinion, and wherein the tooth gap is disposed at an outer circumference of the coupling part.

12. The device for automatic slack adjustment according to claim 9, wherein the gear coupling includes at least one tooth gap of the pinion and at least one tooth of the coupling part of the one-way coupling.

13. The device for automatic slack adjustment according to claim 12, wherein the tooth gap is disposed at an inner periphery of the pinion, and wherein the tooth is disposed in an outer circumference of the coupling part.

14. Device for an automatic slack adjustment of a brake, in particular a vehicle brake, comprising:
a) a brake lever disposed on a brake-operating shaft and furnished with a slack adjustment device between the brake lever and the brake-operating shaft, where the brake operating shaft is adjustable by turning the brake-operating shaft around its rotation axis relative to the brake lever position with the slack adjustment device;
b) a drive device for actuating the slack adjustment device, where the drive device is disposed between a reference point, fixed relative to the brake lever, and the slack adjustment device;
c) the drive device connectable to the slack adjustment device via a one-way coupling, where the one-way coupling only forms a fixed connection, excluding relative rotation, between the drive device and the slack adjustment device in case where the slack adjustment device is moved in a direction effecting an actuation of the brakes for decreasing the brake slack and release gap between the brake shoes and the brake drum;
d) the one-way coupling is formed such that the fixed connection, excluding relative rotation, between the drive device and the slack adjustment device is generated by a motion of the brake lever into a brake-actuating direction;

e) a lost motion device (16, 27; 28, 29) serving for a lifting of the fixed connection excluding relative rotation between the drive device and the slack adjustment device during an overcoming of a preset brake slack and release gap, wherein f) the drive device (8, 9, 12) is formed as a gear rack drive and exhibits a gear wheel (8), fixedly connected under exclusion of relative rotation to the fixed reference point (7), wherein the gear wheel (8) engages with a first set of gear teeth (10) of the gear rack (9) of the gear rack drive;

g) the gear rack (9) exhibits a second set of gear teeth (11), which engages with a pinion (12) driving the slack adjustment device such that upon completion of the actuation there is a free space on top and bottom of the gear rack such that no precise readjustment is necessary upon a reworking of a brake lining;

h) the casing (25) of the brake lever (1), surrounding the gear rack drive, is furnished with free spaces (30, 31) in longitudinal direction of the gear rack (9), where the free spaces (30, 31) are formed such that the possible turning of the brake lever (1), relative to the fixed reference point (7) and thus the stroke of the gear rack, can be larger than the stroke which is determined by the brake slack and release gap.

15. Device for an automatic slack adjustment of a brake, in particular a vehicle brake, comprising:

a) a brake lever disposed on a brake-operating shaft and furnished with a slack adjustment device between the brake lever and the brake-operating shaft, where the brake operating shaft is adjustable by turning the brake-operating shaft around its rotation axis relative to the brake lever position with the slack adjustment device;

b) a drive device for actuating the slack adjustment device, where the drive device is disposed between a reference point, fixed relative to the brake lever, and a readjustment device;

c) the drive device connectable to the slack adjustment device via a one-way coupling, where the one-way coupling only forms a fixed connection, excluding relative rotation, between the drive device and the slack adjustment device in case where the slack adjustment device is moved in a direction effecting an actuation of the brakes for decreasing a brake slack and a release gap between the brake shoes and the brake drum;

d) the one-way coupling is formed such that the fixed connection, excluding relative rotation, between the drive device and the slack adjustment device is generated by a motion of the brake lever into a brake-actuating direction;

e) a lost motion device (16, 27; 28, 29) serving for a lifting of the fixed connection excluding relative rotation between the drive device and the slack adjustment device during an overcoming of a preset brake slack and release gap, wherein f) the drive device (8, 9, 12) is formed as a gear rack drive and exhibits a gear wheel (8), fixedly connected under exclusion of relative rotation to the fixed reference point (7), wherein the gear wheel (8) engages with a first set of gear teeth (10) of the gear rack (9) of the gear rack drive;

g) the gear rack (9) exhibits a second set of gear teeth (11), which engages with a pinion (12) driving the slack adjustment device;

h) the casing (25) of the brake lever (1), surrounding the gear rack drive, is furnished with free spaces (30, 31) in longitudinal direction of the gear rack (9), where the free spaces (30, 31) are formed such that the possible turning of the brake lever (1), relative to the fixed reference point (7) and thus the stroke of the gear rack, can be larger than the stroke which is determined by the brake slack and the release gap, wherein the lost motion device (16, 17; 28, 29) is formed by a gear coupling (16, 17; 28, 29) disposed between the pinion (12) and a coupling part (14) of a one-way coupling (13, 14, 15), wherein the gear coupling (16, 17; 28, 29) exhibits a lost motion path generated by gear back lash (S), which lost motion path corresponds to a predetermined brake slack and release gap.

16. Device according to claim 15, wherein the gear coupling (16, 17; 28, 29) includes at least one tooth (16) of the pinion (12), disposed at the inner periphery of the pinion 12, and at least one tooth gap (28) of the coupling part (14) of the one-way coupling (13, 14, 15), disposed at the outer circumference of coupling part (14).

17. Device according to claim 15, wherein the gear coupling (16, 17; 28, 29) includes at least one tooth gap (17) of the pinion (12), disposed at the inner periphery of the pinion (12), and at least one tooth (29) of the coupling part (14) of the one-way coupling (13, 14, 15), disposed at the outer circumference of coupling part (14).

18. A device for an automatic slack adjustment of a brake comprising:

a brake lever;

a worm rotatably supported in the brake lever;

a gear rack having a first set of gear teeth and having a second set of gear teeth;

a gear wheel for solid attachment to a vehicle chassis and thereby excluding rotation of the gear wheel relative to the vehicle chassis, wherein the gear wheel engages with the first set of gear teeth of the gear rack of a gear rack drive, and wherein the gear rack and the gear wheel are disposed between a reference point fixed relative to the brake lever and the worm;

a pinion engaging the second set of gear teeth of the gear rack, wherein the pinion drives the worm and includes a first projection;

a one-way coupling including a second projection engaging the first projection under play representing a lost motion and serving for a lifting of a fixed connection, excluding relative rotation, from the gear rack and gear wheel to the worm during an overcoming of a preset brake slack and a release gap, said one-way coupling being engageable with the worm such that the fixed connection, excluding relative rotation, between the pinion and the worm is generated by a motion of the brake lever into a brake-actuating direction, wherein the one-way coupling connects the gear rack and the gear wheel to the worm, wherein the one-way coupling only forms a fixed connection, excluding relative rotation, from the gear rack and gear wheel to the worm in case where the worm is moved in a direction effecting an actuation of the brakes for decreasing a brake slack and a release gap between the brake shoes and the brake drum, wherein upon completion of an actuation there is a free space on top and bottom of the gear rack such that no precise readjustment is necessary upon reworking of a brake line;

a casing of the brake lever surrounding the gear rack drive and furnished with free spaces disposed in longitudinal direction of the gear rack and surrounding the gear rack, wherein the free spaces are formed such that the possible turning of the brake lever, relative to the vehicle chassis and thus the stroke of the gear rack, can be larger than the stroke which is determined by the size of brake slack and release gap.

* * * * *